Figure 1A:
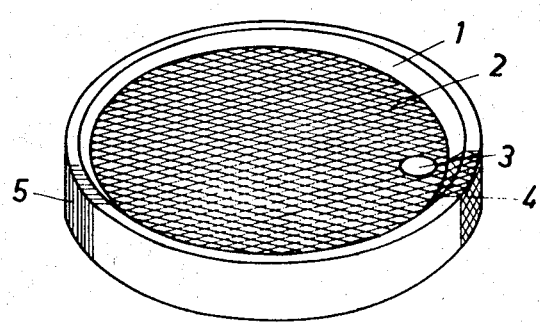

United States Patent

[11] 3,615,851

[72] Inventor Hans Hermann Eysel
  am Kirchwald, Germany
[21] Appl. No. 860,900
[22] Filed Sept. 25, 1969
[45] Patented Oct. 26, 1971
[73] Assignee Brown, Boveri & Cie Aktiengesellschaft
  Kallstadter Str. 1, Germany
[32] Priority Nov. 20, 1968
[33] Germany
[31] P 18 09 878.7

[54] BATTERY WITH FUEL CELLS OF SOLID ELECTROLYTE
  5 Claims, 9 Drawing Figs.
[52] U.S. Cl. .................................................. 136/86 R
[51] Int. Cl. .................................................. H01m 27/00
[50] Field of Search .......................................... 136/86

[56] References Cited
UNITED STATES PATENTS
3,489,614  1/1970  Tomter ...................... 136/86
3,508,970  4/1970  Grubb et al. ................ 136/86

Primary Examiner—Winston A. Douglas
Assistant Examiner—H. A. Feeley
Attorney—Jacobs & Jacobs ABSTRACT: A battery made up of fuel cells each having a solid electrolyte for direct conversion of chemical energy liberated in the oxidation of a combustible gas into electrical energy. The fuel cells are arranged in series each forming a subchamber and being combined into a chamber for the combustible gas. Each fuel cell has one electrode on an inner wall of the subchamber and its other electrode on an outer wall of the cell. The subchamber is formed by each of two successive cells with a temperature-resistant packing between cells so as to exert a sealing effect obtained by a force compressing the cells and packings. Each fuel cell is in the form of a portion of a cylinder made in one or two pieces having a cylindrical periphery and faces perpendicular to its axis, at least one face being recessed and the subchamber formed by putting two successive cells together.

PATENTED OCT 26 1971  3,615,851

SHEET 1 OF 2

Inventor:
HANS HERMANN EYSEL
By Jacobi + Jacobi

PATENTED OCT 26 1971 3,615,851

SHEET 2 OF 2

Inventor:
HANS HERMANN EYSEL
By Jacobs & Jacobs

BATTERY WITH FUEL CELLS OF SOLID ELECTROLYTE

This invention relates to a battery with a plurality of fuel cells consisting of a solid electrolyte for the direct conversion of the chemical energy liberated in the oxidation of a combustible gas into electrical energy.

At operating temperatures of 600° to 1,200° C., the electrolyte generally consists of an oxide ceramic mass possessing a high oxygen ion conductivity and referred to as solid electrolyte It is provided on either side with electrodes and current outlets. One electrode is supplied with the fuel, for example hydrogen, and the other electrode with oxygen, for example as a constituent of the air. The oxygen partial pressure determined by the position of the chemical equilibrium is very different on the two sides of the cell. This leads to the establishment of a potential difference between the two electrodes, so that electrical energy can be withdrawn from the cell by way of a consuming circuit. The oxygen migrating through the solid electrolyte during the passage of current owing to the ionic output mechanism reacts with the fuel by an electrochemical anode reaction. In these processes, essentially the kinetics of the two electrodes and the electrodes and the electrolyte resistance determine the electrochemical efficiency, while the position of the equilibrium of the oxidation-reduction reaction determines the utilization capacity of the fuel.

It is known (e.g., BBC-Mitteilungen 1966,p. 29) that a plurality of such cells may be combined to form a battery. One of the main problems in the manufacture of such batteries is the sealing technology which is difficult because of the high-operating temperature. In particular, the fusing of the tubular gas chambers to disc-shaped electrolytes of small thickness and the simultaneously necessary gastight passage of the current outlets involve production difficulties. Finally, the minimum dimensions of tubular gas chambers required for acceptable M of such connection techniques lead to low output density and a high weight-power ratio.

The object of the present invention is to avoid the disadvantages of known fuel cells, and in particular to provide a fuel cell in which the gas chambers are kept very small, the fusing-in of current outlets is eliminated, and special conformation of the electrolyte disc saves one seal per disc.

To solve this problem, the invention proceeds from a battery with a plurality of fuel cells consisting of a solid electrolyte for direct conversion of the chemical energy liberated in the oxidation of a fuel gas into electrical energy, wherein the fuel cells, arranged in series and forming a subchamber in each instance, are combined into a connected chamber containing the fuel gas, and wherein a fuel cell bears one electrode on an inner wall of the subchamber and the other electrode on an outer wall of the cell. The invention comprises a subchamber formed by each two successive cells with a temperature-resistant packing arranged between the cells, the sealing effect of which is produced by a force compressing the cells and the packings.

Figure 1B:
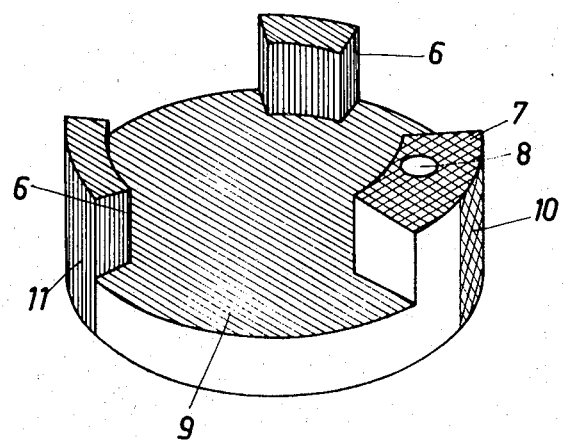
Figure 2A:
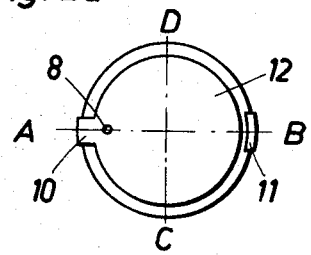
Figure 2B:
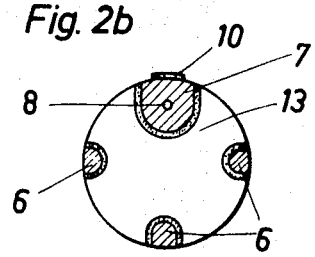
Figure 2C:
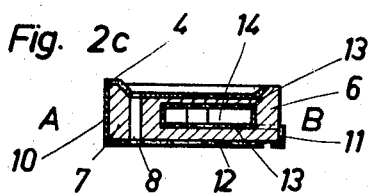
Figure 2D:
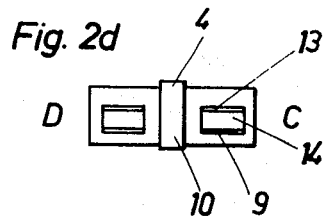
Figure 2E:
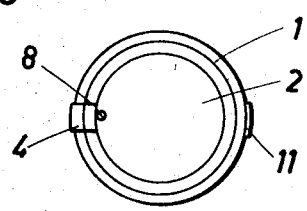
Figure 2F:
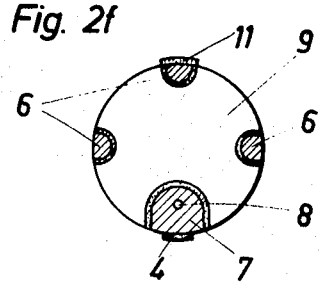
Figure 3:
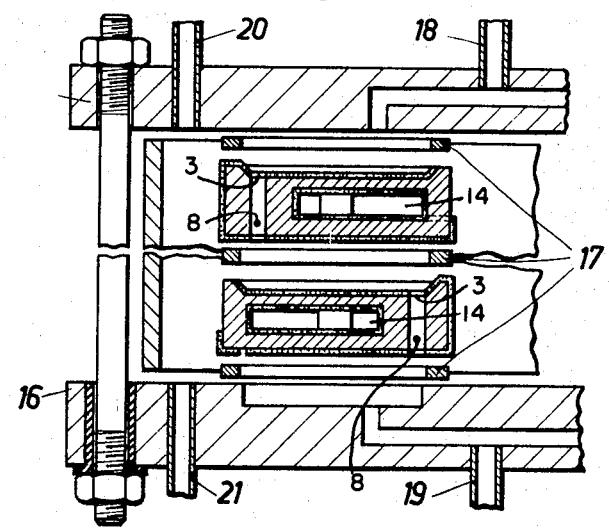

In the accompanying drawings, embodiments of the invention are represented by way of example:

FIGS. 1a and 1b show a battery module consisting of two separate disc-shaped members of solid electrolyte;

FIGS. 2a to 2f show a battery module consisting of a one-piece solid electrolyte member; and, FIG. 3 shows in fragmentary longitudinal section a battery made up of battery modules according to FIGS. 2a to 2b In FIG. 1a, the first disc of the module has a circular cross section. On one side, it has an annular elevation 1 at the edge. Inside this edge, the fuel electrode ("Anode I") 2 is arranged. Further, the element has a hole 3 extending therethrough, and on the under side, the "Cathode I" (not visible in the drawing) cut out only in the region of the hole. From Anode I, a conducting strip 4 passes around the edge of the disc to the under side of the disc in the region of the hole, while a conducting strip 5 passes from Cathode I to the annular elevation. FIG. 1b shows the other disc of the module. It has three or more arcuate elevations 6, 7 on one side. Of these, the elevation 7 is enlarged to accommodate a hole 8. This side of the element is covered with the oxygen electrode 9 (Cathode II) which also covers the elevations 6 and is conductively connected by them to Cathode I upon assembly. On the under side of this element is Anode II, cutting out an annular rim. From Anode II, a conducting strip 10 leads to the top of elevation 7. By way of one of the elevations 6, a conductive strip 11 leads to the electrodeless edge of the under side. Conductors 4 and 10 connect Anodes I and II of the module in parallel. Holes 3 and 8 connect the gas chambers in contact with the anodes. The elements of FIGS. 1a and 1b, aligned as shown, form a battery module. The several modules are stacked with interpostion of an asbestos felt gasket metallized in certain areas only. The battery is thereby circuited in parallel when the conductors 4 and 10 and conductors 5 and 11 of each two modules are conductively connected, whereas for circuiting in series, conductors 5 and 10 of two modules are connected and conductors 4 and 11 insulated from each other.

The fixedly connected module of FIGS. 2a to 2f may be understood by reference to a numbering analogous to that of FIGS. 1a and 1b. FIG. 2a shows the under side of the module with Anode II 12 and the two conductive strips 10 and 11. FIG. 2b is a section of the module in a plane between the two discs with the Cathode I 13 in view, which in this form of the invention covers the insides of all elevations 6 and 7, here forming bridges between the two discs and thus is conductively connected to the Cathode II 9. The enlarged bridge 7 contains the hole 8 passing through both elements. Through this hole, again, the fuel gas chambers of the battery communicate. FIG. 2c shows a section AB parallel to the centerline of the battery through both discs of a module. A projection onto the CD plane illustrates the represented features in FIG. 2d. FIG. 2e again represents the top face of the module with the Anode I 2 and the electrode-free elevated rim 1. FIG. 2f, finally represents the same section as FIG. 2b, viewed in the opposite direction. It shows the Cathode II 9.

The solid electrolyte members of FIG. 1 or of FIG. 2, as many as desired placed upon one another, are pressed together in gastight manner at the interposed gaskets 17 by means of two flanges 15, 16 into one or more stacks within a common tubular sleeve. FIG. 3 illustrates this for a battery with solid electrolyte members according to FIG. 2c. The pipe connections 18, 19 serve to carry combustible gas, and pipe connections 20, 21 oxygen or air. FIG. 3 further shows the modules circuited in series; for circuiting in parallel, analogously to the embodiment of the invention first described, the modules must be so superimposed that the metallized areas of the gaskets conductively connnect like electrodes of different modules in each instance. In both cases, the gaskets at the flanges are each provided with one conductive area only, so that one flange becomes the positive pole and the other the negative pole of the battery.

What is claimed is:

1. A battery for the direct conversion of chemical energy liberated in the oxidation of a combustible gas into electrical energy comprising a plurality of fuel modules arranged in series between compressing means, each fuel module consisting of two disc-shaped elements each of which has a solid electrolyte, a first anodic electrode on one surface and a second cathodic electrode on its other surface, one of the disc-shaped elements of each fuel module having a plurality of arcuate elevations which form a subchamber space in the module whereby the two elements of each module are arranged so that only one type of electrode forms part of the subchamber, the battery further comprising a tubular sleeve spaced from the modules to produce a first gas chamber in communication with the subchamber, a plurality of temperature-resistant sealing gaskets arranged between the fuel modules and spacing second gas chambers between the modules, the second gas chambers being in communication by means of holes extending through the modules, each sealing gasket comprising at least one metallized area which is in contact with strip conductors connected to the electrodes of adjacent fuel modules.

2. A battery according to claim 1, wherein the strip conductors of each module are arranged on the cylindrical periphery thereof, a first strip conductor connecting the first electrodes of each module and a second strip conductor connecting the second electrodes.

3. A battery according to claim 1, wherein the solid electrolyte consists of an oxide ceramic mass with high oxygen ion conductivity.

4. A battery according to claim 1, wherein the compressing means include two flanges which are connected by bolts.

5. A battery according to claim 4, wherein the flanges are in electrical contact with adjacent sealing gaskets, one flange becoming the positive pole of the battery and the other flange becoming the negative pole.